(12) United States Patent
Burke, II

(10) Patent No.: US 8,091,588 B2
(45) Date of Patent: Jan. 10, 2012

(54) METALLIC TUBULAR STRUCTURE

(75) Inventor: Charles S. Burke, II, Troy, MI (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 804 days.

(21) Appl. No.: 12/129,738

(22) Filed: May 30, 2008

(65) Prior Publication Data

US 2009/0293980 A1 Dec. 3, 2009

(51) Int. Cl.
*F16L 9/14* (2006.01)

(52) U.S. Cl. ........ 138/143; 138/140; 138/139; 138/109; 138/173

(58) Field of Classification Search ........... 138/138, 138/139, 143, 109, 172, 173, 121; 285/405
See application file for complete search history.

(56) References Cited

U.S. PATENT DOCUMENTS

| | | | | |
|---|---|---|---|---|
| 723,135 | A * | 3/1903 | Browne | 464/174 |
| 858,100 | A * | 6/1907 | Pedersen | 285/187 |
| 3,895,177 | A * | 7/1975 | Muslin | 174/669 |
| 4,009,733 | A * | 3/1977 | Schnabel | 138/103 |
| 4,185,844 | A | 1/1980 | Hubbard et al. | |
| 4,388,752 | A * | 6/1983 | Vinciguerra et al. | 29/421.1 |
| 5,253,773 | A | 10/1993 | Choma et al. | |
| 5,390,808 | A | 2/1995 | Choma et al. | |
| 5,553,640 | A | 9/1996 | Ferenczy et al. | |
| 5,581,862 | A | 12/1996 | Choma et al. | |
| 5,620,805 | A | 4/1997 | Ogawa et al. | |
| 5,775,378 | A * | 7/1998 | Auvil et al. | 138/143 |
| 5,918,643 | A | 7/1999 | Roloff et al. | |
| 6,474,534 | B2 | 11/2002 | Gabbianelli et al. | |
| 6,668,455 | B2 | 12/2003 | Duvall et al. | |
| 6,802,430 | B2 | 10/2004 | Tomimura et al. | |
| 6,824,173 | B2 * | 11/2004 | Usui | 285/353 |
| 6,851,455 | B2 | 2/2005 | Otsuka et al. | |
| 6,989,198 | B2 | 1/2006 | Masuda et al. | |
| 7,048,019 | B2 | 5/2006 | Pacitto, Jr. et al. | |
| 2004/0076783 | A1 | 4/2004 | Norman et al. | |
| 2004/0201217 | A1 | 10/2004 | Mobley et al. | |
| 2005/0280259 | A1 | 12/2005 | Sausner et al. | |
| 2007/0065616 | A1 | 3/2007 | Fauble | |

* cited by examiner

*Primary Examiner* — Patrick F Brinson
(74) *Attorney, Agent, or Firm* — Marshall & Melhorn, LLC

(57) ABSTRACT

A metallic tubular structure having an inner surface providing a passage for conveying fluid or vapor, an outer surface, a multi-layer, strength-enhanced first end segment, a multi-layer, strength-enhanced second end segment, and a flexible segment intermediate the multi-layer, strength-enhanced first end segment and the multi-layer, strength-enhanced second end segment, the metallic tubular structure comprising: a first inner metallic tubular member, the inner surface thereof providing a fluid- or vapor-conveying passage for conveying fluid or vapor therethrough, the first inner metallic tubular member longitudinally extending the entire length of the metallic tubular structure, the first inner metallic tubular member comprising one or more metallic layers; a second metallic tubular member circumferentially disposed on the outer surface of a first end of the first inner metallic tubular member, the second metallic tubular member longitudinally extending a predetermined distance on the first inner metallic tubular member forming a multi-layer, strength-enhanced first end segment thereat; and a third metallic tubular member circumferentially disposed on the outer surface of a second end of the first inner metallic tubular member, the third metallic tubular member longitudinally extending a predetermined distance on the first inner metallic tubular member forming a multi-layer, strength-enhanced second end segment thereat, wherein each of the second metallic tubular member and the third metallic tubular member form spaced apart tubular members so that the two spaced apart metallic tubular member are not contiguous with one another.

20 Claims, 2 Drawing Sheets

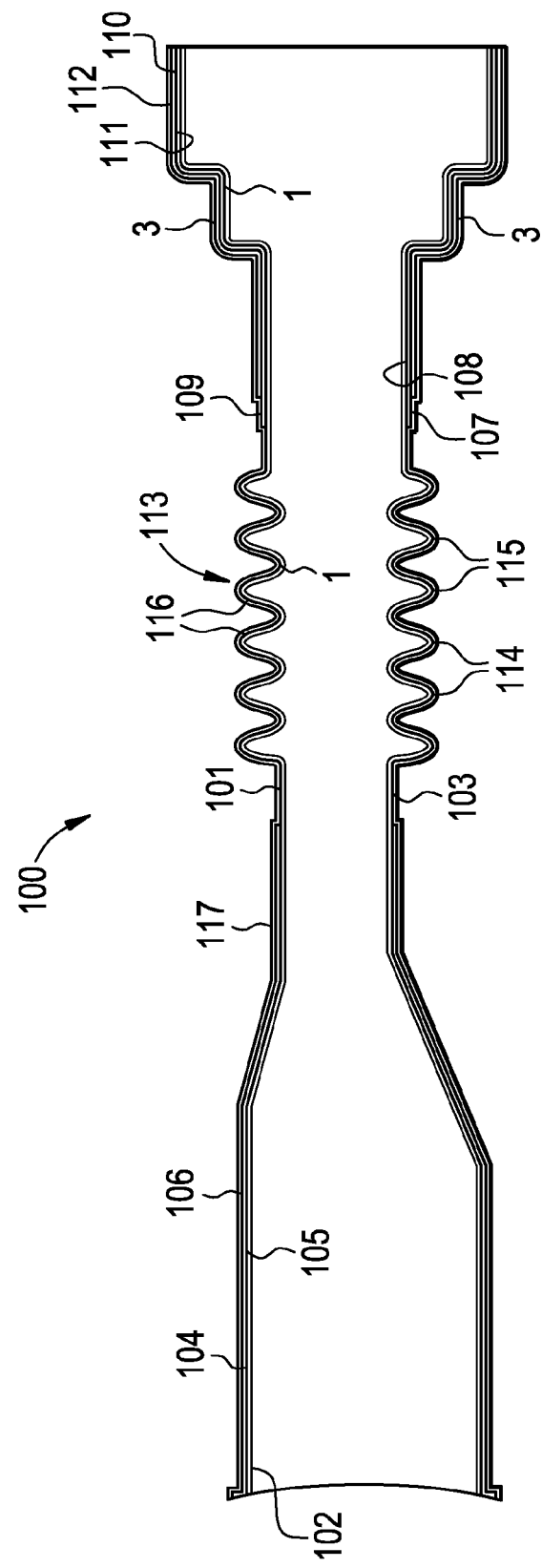

METALLIC TUBULAR STRUCTURE

BACKGROUND OF THE INVENTION

1. Field of the Invention

The present invention relates generally to tubular structures and, particularly, to metallic fuel filler tubes such as fuel filler tubes for delivering fuel from a fuel filler port to a fuel tank in an automobile and to a method for manufacturing such metallic fuel filler tubular structures.

2. Technical Background and Related Art

Fuel filler tubes are tubular structures extending from a fuel filler port to a fuel storage tank in a vehicle and provide a conduit for delivering fuel from a nozzle designed to deliver fuel from fuel source such as a gas pump to the fuel storage tank. Fuel filler tubes have been constructed from a variety of materials such as metals and polymers in order to prevent permeation of fuel vapor into the atmosphere. Previously, metals, such as steel, were used in the manufacture of fuel filler tubes. Metal fuel filler tubes were effective in preventing initial permeation of fuel vapor, but were highly susceptible to corrosion which led to eventual permeation of fuel through corroded holes or cracks in the fuel filler tube. Polymeric materials are effective to overcome the corrosion problem, but they require multiple layers of specialized polymeric materials and complex formulations in order to reduce permeation of fuel vapor to an acceptable level. Recently, the expense of specialized polymeric materials due to the increasing cost of oil which is the main ingredient in producing polymeric materials, and the increased manufacturing cost of the complex blends and formulations of the polymeric materials, are causing the industry to reevaluate the use of polymeric materials and look to metallic materials such as steels having improved corrosion resistance for the manufacture of fuel filler tubes as well as other fluid and vapor tubes.

In the past, fuel filler tubes made of steel pipe have been coated with a chromium layer and then painted. However, such coated and painted steel fuel filler tubes are not always protected from corrosion, particularly in areas having a high salt environment such as coastal areas and where road salt is used in winter to remove ice from roadways. Additionally, corrosion can also occur inside the fuel filler tube when exposed to a corrosive atmosphere containing denatured gasoline or alcohol-based fuels. Examples of metallic tubes for various uses are found in the following U.S. patent application Publication and in the following U.S. patents:

U.S. Pat. Appln. No. 2005/0280259 A1 to Sausner, et al. describes a multilayer metallic high pressure conduit for a high pressure medium such as used in a fuel injection system in a motor vehicle. The multilayer conduit has a metallic inner layer, one or more metallic intermediate layers and a metallic outer layer. The layers forming the conduit are coaxially fitted into and pressed against one. Each of the inner layer, the one or more intermediate layers and the outer layer are formed of steel, preferably stainless steel, and all of the layers extend the longitudinal length of the conduit.

U.S. Pat. No. 7,048,019 B2 to Pacitto, Jr., et al. teaches a fuel filler assembly including a single layer fuel filler tube formed by cutting a length of tube stock which may be a metal or a polymer. One end of the tube is joined to a funnel insert and the opposite end is joined to a fuel tank. Preferably, the fuel filler tube includes an integrally formed nozzle receptor.

U.S. Pat. No. 6,851,455 B2 to Otsuka, et al. describes a single layer metallic fuel filler tube made of austenitic stainless steel having improved corrosion resistance.

U.S. Pat. No. 6,802,430 B2 to Tomimura, et al. describes a single layer metallic fuel filler tube made from ferritic stainless, which is coated with a corrosion-preventing material such as a cathodic paint or a plating of Al, Zn or Zn alloy containing one or more of Fe, Ni, Co, Mg, Cr, Sn and Al.

U.S. Pat. No. 6,668,455 B2 to Duvall, et al. describes a multi-layer tube having a metal inner tube having a Zn coating such as Zn plating, Zn—Ni alloys, Zn—Co alloys, Zn—Al alloys, and mixtures thereof, and a surface treatment coating bonded to the Zn layer. The Zn layer is a Zn/Al/rare earth alloy, phosphate, chromate or a mixture thereof. One or more polymeric layers form the outer surface of the tube. The invention is concerned with the removal of the one or more polymeric outer layers adjacent the sealing areas of the tube to prevent potential loss of assembly torque over the long term of a vehicle's life, which could occur if the relatively soft polymeric material should extrude out of the sealing area and fitting compression area after assembly.

U.S. Pat. No. 5,620,805 to Ogawa, et al. teaches a multi-layer steel tube for boilers, etc. used in installations where fossil fuel or combustible refuse is burnt. The multilayer steel tube has a base steel layer and an inner liner and an outer liner, wherein the inner and outer liners provide corrosion resistance in an environment where fuel containing V, Na, S and Cl is burnt. The inner and outer layers comprise an alloy containing up to 0.05% C, 1.0-2.6% Si, 0.02-0.5% Mn, 20.0-28.0% Cr, 24-36% Ni, up to 4.0% Mo, up to 0.4% Nb, up to 0.05% Al, and the balance Fe.

U.S. Pat. Nos. 5,581,862; 5,390,808; and 5,253,773, all to Choma, et al., disclose a single rolled steel tube which includes a plurality of sections having varying diameters.

U.S. Pat. No. 5,553,640 to Ferenczy, et al. disclose a flat steel band having a copper alloy brazing layer fixedly attached to at least one side of the steel band. The steel band is helically wound and subsequently soldered to form a multilayer tube that is particularly useful for brake line in a motor vehicle.

U.S. Pat. No. 4,185,844 to Hubbard, et al. discloses a single layer aluminum fuel filler tube.

The emergence of new and better steels is one reason for the recent trend towards the use of metals, particularly steel, in the manufacture of fuel filler tubes. Metals such as anti-corrosive steel provide excellent barrier properties against hydrocarbon permeation. Metals also provide high structural integrity. However, there are still obstacles to be overcome in order to rely totally on metal fuel filler tubes. For example, in conventional metallic fuel filler tubes, the assembly typically requires a non-metallic joint in order to achieve a robust connection of the fuel filler tube to the fuel tank. Furthermore, the non-flexibility of metallic fuel filler tubes make it difficult to employ such metallic fuel filler tubes in today's automotive vehicles because of reduced space constraints.

Accordingly, there is a need in the industry for a fuel filler tube which overcomes the above disadvantages.

SUMMARY OF THE INVENTION

In accordance with the present invention, a novel fuel filler tube is provided for conveying fuel from a fuel supply nozzle to a fuel tank in an automotive vehicle, wherein the fuel filler tube exhibits superior mechanical characteristics as well as reduced fuel-associated emissions. The superior mechanical characteristics of the novel fuel filler tube allow the fuel filler tube of the present invention to be employed in applications where the fuel filler tube is required to exhibit high structural rigidity in certain portions of the tube while simultaneously exhibiting improved flexibility in other portions of the tube. For example, the fuel filler tube of the present invention is highly effective in the automotive industry where the fuel filler tube must be sufficiently rigid enough to withstand the effects of a sudden or unexpected impact, as well as meeting the stringent spatial requirements for installing a fuel filler tube in an automotive vehicle. More specifically, the fuel filler tube of the present invention is constructed from one or more individual metallic layers forming a continuous metallic inner layer having an inner surface and an outer surface, a first end configured to accept a nozzle from a fuel source and a second end configured to be connected to a fuel tank. A second metallic tubular member constructed from one or more metallic layers having a longitudinal length substantially shorter than the first metallic tubular member is strategically disposed on the outer surface of the first end of the first metallic tubular member so that the second tubular member extends from the first end of the first metallic tubular member a predetermined distance. A third metallic tubular member constructed from one or more metallic layers having a longitudinal length substantially shorter than the first metallic tubular member is formed on the second end of the first metallic tubular member wherein the second metallic tubular member extends from the second end of the first metallic tubular member a predetermined distance. Typically, the second and third metallic tubular members extend from each end of the first metallic tubular member to provide a multi-layer configuration at each end of the first metallic tubular member. The second and third metallic tubular members are longitudinally spaced apart so that the outer surface of the first metallic tubular member intermediate the second and third metallic tubular members, is free from any additional metallic tubular member. A fourth metallic tubular member which may include one or more individual metallic layers is formed on at least one of the second and third metallic tubular members. Preferably, the fourth metallic tubular member is formed on the outer surface of the third metallic tubular member to achieve a robust connection to the fuel tank. The outer surfaces of the first metallic tubular member, the second metallic tubular member and the third metallic tubular member form a two-step outer surface of the fuel filler tube. The outer surfaces of the fourth tubular member, the first tubular member and the second tubular member form a three-step outer surface of the fuel filler tube. Each of the first metallic tubular member, the second metallic tubular member, the third metallic tubular member and the fourth metallic tubular member has a predetermined thickness which define the outer circumference of the fuel filler tube at the respective stepped surfaces. Preferably, the first metallic tubular member intermediate the first and second metallic tubular members, being free of any additional metallic tubular member, is configured to provide flexibility to the fuel filler tube. Typically, such configuration is a corrugated or convoluted configuration; however, such configuration may take one or more profiles or shapes known in the art depending on the flexibility and routing of fluid in the particular flexible section formed. Other features such as strengthening ribs or cathedral bends can be used in place of or in conjunction with the corrugations. By adding multiple metallic tubular layers at one or more locations of the fuel filler tube, greater structural strength can be achieved while, at the other locations containing a less number of metallic tubular layers, features such as corrugations may be formed to provide flexibility to the fuel filler tube. A particular advantage of the fuel filler tube of the present invention is that no weld joints are required in forming the fuel filler tube or in connecting the fuel filler tube to the fuel tank of an automotive vehicle.

BRIEF DESCRIPTION OF THE DRAWINGS

FIG. 2 is a side view illustrating the arrangement of the layers forming a multi-layer fuel filler hose having corrugation therein in accordance with a preferred aspect of the invention.

DETAILED DESCRIPTION OF THE INVENTION

Figure 1:
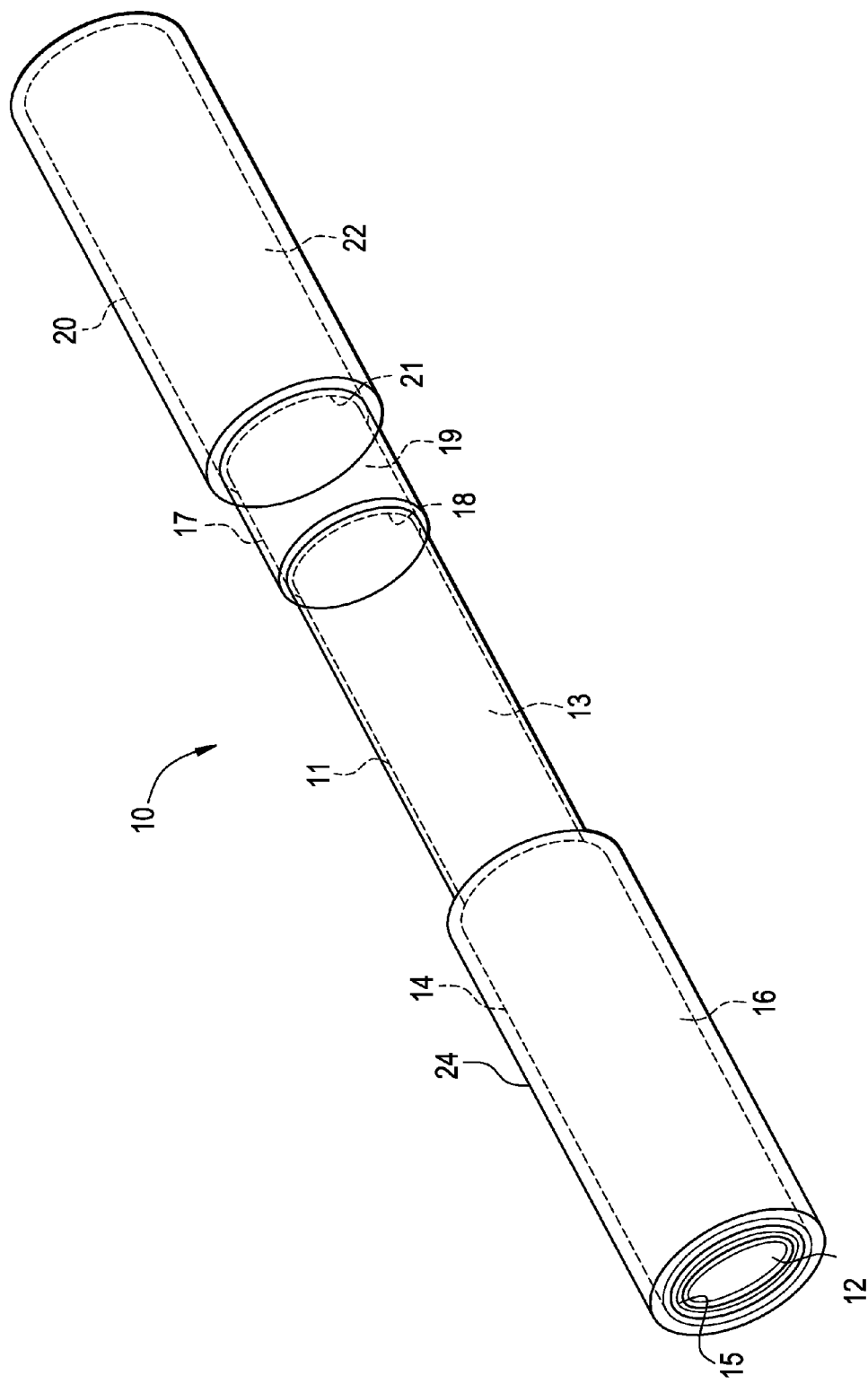
FIG. 1 is a partially cutaway perspective view illustrating the arrangement of the layers forming a multi-layer fuel filler hose of the invention.

A fuel filler tube having a plurality of metallic members at specified locations along the longitudinal axis of the fuel filler tube, and a single layer of a metallic member at a specified location along the longitudinal axis of the fuel filler tube exhibits improved structural characteristics not realized by conventional fuel filler tubes. More particularly, the fuel filler tube of the present invention includes a plurality of metallic members (or layers) at specified locations along the longitudinal axis of the fuel filler tube which imparts significantly greater structural strength to the fuel filler tube while a corrugated or convoluted section in a single metallic layer imparts improved flexibility of the fuel filler tube.

As illustrated in FIG. 1, a tubular structure 10 of the present invention includes an inner metallic tubular member 11 having an inner surface 12 and an outer surface 13, a second metallic tubular member 14 having an inner surface 15 and an outer surface 16 disposed on the outer surface 13 of the inner metallic tubular member 11, a third metallic tubular member 17 having an inner surface 18 and an outer surface 19 disposed on the outer surface 13 of the inner metallic tubular member 11, and a fourth metallic tubular member 20 having an inner surface 21 and an outer surface 22 disposed on the outer surface 19 of the third metallic member 17. A protective cover 24 may be formed on the outer surface of the tubular structure 10.

As illustrated in FIG. 2, a preferred fuel filler tube 100 of the present invention includes an inner metallic tubular member 101 having an inner surface 102 and an outer surface 103, a second metallic tubular member 104 having an inner surface 105 and an outer surface 106 disposed on the outer surface 103 of the inner metallic tubular member 101, a third metallic tubular member 107 having an inner surface 108 and an outer surface 109 disposed on the outer surface 103 of the inner metallic tubular member 101, a fourth metallic tubular member 110 having an inner surface 111 and an outer surface 112 disposed on the outer surface 109 of the third metallic member 107, a corrugated or convoluted structure 113 having alternating crests 114 and valleys 115 interconnected by shallow angled side walls 116. The multi-layer metallic tubular members provide a substantially improved structural strength to the fuel filler tube while the corrugations or convolutions provide flexibility to the fuel filler tube so that the fuel filler tube can be easily shaped into any desirable configuration. In certain applications, an outer protective cover 117 may be desired to protect the fuel filler tube 100 from environmental hazards or provide further corrosion protection. Typically, such protective cover is a polymeric material circumferentially disposed on the outer surface of the tubular structure. The polymeric protective cover is formed from any of the materials known in the art for such purpose. For example, such protective covers are typically formed from polymeric materials such as styrene-butadiene rubber (SBR), butadiene-nitrile rubber (NBR), chlorinated polyethylene, (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers (EPDM), ethylene-propylene-diene terpolymers, ultra high molecular weight polyethylene, high density polyethylene, ethylene-acrylic, polyacrylic, polyamide, and blends thereof.

The fuel filler tube of the invention includes a first inner member having an inner surface and an outer surface. The length of the first inner member is such that the first inner member extends the entire length of the fuel filler tube with the inner surface of the first inner member forming the entire inner surface of the fuel filler tube. A second tubular member and a third tubular member, each having a length shorter than the first inner tubular member, is formed on a first end portion and a second end portion, respectively, of the first tubular member such that each of the second tubular member and the third tubular member extends a predetermined distance from the first end and the second end, respectively, of the inner tubular member to provide first and second multi-layer segments having improved structural strength. The first end of the fuel filler tube is defined as having a funnel-like shape designed to sealably connect to a fuel inlet port on the automotive vehicle. Typically, a fourth tubular member is formed on at least a portion of the third tubular member to provide further structural strength to the second end of the fuel filler tube which is designed to sealably connect with a fuel tank as discussed below.

In order to meet the stringent permeability requirement imposed by Federal and State regulations and to provide structural stability under adverse conditions for long periods of time, the tubular members of the present invention are formed from a metallic material capable of meeting the above permeability requirements while providing the necessary structural stability. In accordance with the present invention, the metallic materials are those having sufficient structural strength and fuel permeation resistance. Representative metallic materials include steel, stainless steel, hot rolled steel, alloys of steel with other suitable metals, aluminum, etc. The preferred metallic materials are any of the metals recognized in the art as having enhanced corrosion resistance and improve structural characteristics. Most preferably, the metal is steel having superior corrosion resistance while providing the necessary structural integrity to perform as a fuel filler tube in a harsh environment for long periods of time. The metals may be of similar or dissimilar grades and the metal forming any one of the various members may be the same metal used in the other metal tubular members. Furthermore, any of the various layers may be constructed from one or more individual layers of the acceptable metal(s). The choice of metals is determined by numerous considerations such as cost, suitability in specific locations, etc.

The thickness of the various metallic tubular members is determined by the particular metal employed, the placement of the specific metallic tubular member incorporated in the fuel filler tube and the structural demands placed on the particular metallic tubular member. Typically, the thickness of the layers used to form the metallic fuel filler tube of the invention should be no more than that necessary to provide the required structural strength and fuel impermeability to the metallic fuel filler tube of the invention while allowing the fuel filler tube to function in a desired manner without providing undue weight to the tubular structure. While the above discussion has been directed to specific metallic tubular members, such metallic tubular members are not to be limited to only those specific metallic tubular members described, but may include other metallic tubular members having the same or different thickness in other segments of the fuel filler tube to provide one or more desired characteristics.

The corrugated or convoluted segment of the first metallic tubular member exhibits any configuration commonly known in the art to provide flexibility to the fuel filler tube. Typically, the corrugation or convolution segment includes a plurality of alternating crests and valleys interconnected by shallow angled side walls. The corrugations or convolutions provide a certain amount of flexibility to the fuel filler tube so that it can be easily bent and shaped to fit into a confined space. While the metallic fuel filler tube is shown to include one corrugated or convoluted segment, it is to be understood that additional corrugated or convoluted segments may be employed depending on the number of bends necessary to meet the space requirements for the metallic fuel filler tube. In addition, the metallic fuel filler tube of the invention may include other features capable of enhancing the characteristics of the metallic fuel filler tube. For example, strengthening ribs and cathedral bends may be utilized to provide their desirable features.

The metallic fuel filler tube typically exhibits a funnel-shaped end that is sealably connected to the fuel inlet port, by any conventional means known in the art, for accepting a fuel nozzle in supplying fuel through the metallic fuel filler tube to the fuel tank. The multi-layer funnel-shaped end of the inventive multi-layer fuel filler tube is uniquely distinct from current single metallic layer tubes.

At the opposite end from the funnel-shaped connection, the metallic fuel filler tube is connected to the fuel tank by an assembly commonly known in the art such as a male/female quick connect/release housing, or is end-formed for hose joint to provide a substantially greater structural strength than conventional connections.

A method for forming the metallic fuel filler tube of the present invention is also described wherein the inner most metallic member is one continuous tube and the additional layers are sleeved over the continuous inner tubular member. Each additional layer is formed to an interference fit. Typically, the forming process would be performed through mechanical and/or hydroform expansion and/or reduction of the appropriate tubular members after formation of the metallic fuel filler tube, although, it is within the concept of the invention to form the various layers during construction of the metallic fuel filler tube.

The invention has been defined as a metallic tubular structure and, preferably, as a metallic fuel filler tube for use in automotive applications. However, the use of polymeric materials such as those commonly used in the manufacture of various automotive tubes and hoses or a combination of metallic layers and polymeric layers can be employed instead of the metallic materials in forming the unique tubular structures of the present invention. Furthermore, the tubular structures described herein can be employed in any application requiring substantially greater structural strength as well as sufficient flexibility to allow the tube to be shaped for use in a confined space having one or more configurations.

Having described the invention in detail and illustrated such invention in the drawings, it will be apparent that modifications and variations are possible without departing for the scope and spirit of the invention as defined by the appended claims.

What is claimed is:

1. A metallic tubular structure having a multi-layer, strength-enhanced first end segment, a multi-layer, strength-enhanced second end segment, and a flexible segment intermediate said multi-layer, strength-enhanced first end segment and said multi-layer, strength-enhanced second end segment, said metallic tubular structure comprising:
   a first inner metallic tubular member having an inner surface and an outer surface, said inner surface providing a passage for conveying fluid therethrough, said first inner metallic tubular member longitudinally extending the entire length of said metallic tubular structure, wherein said first inner metallic tubular member is formed from one or more metallic layers;

a second metallic tubular member circumferentially disposed on said outer surface at a first end of said first inner metallic tubular member, said second metallic tubular member longitudinally extending a predetermined distance on said first inner metallic tubular member forming said multi-layer, strength-enhanced first end segment thereat; and a third metallic tubular member circumferentially disposed on said outer surface at a second end of said first inner metallic tubular member, said third metallic tubular member longitudinally extending a predetermined distance on said first inner metallic tubular member forming said multi-layer, strength-enhanced second end segment thereat, wherein said second metallic tubular member and said third metallic tubular member are spaced apart on said first inner metallic tubular member such that said second metallic tubular member and said third metallic tubular member are not contiguous with one another.

2. The metallic tubular structure of claim 1, further comprising:

a fourth metallic tubular member circumferentially disposed on said third metallic tubular member, wherein said fourth metallic tubular member longitudinally extends a predetermined distance on said third metallic tubular member forming a third multi-layer segment thereat.

3. The metallic tubular structure of claim 2 wherein said first inner metallic tubular member, said second metallic tubular member, said third metallic tubular member, and said fourth metallic tubular are formed from similar or dissimilar metals exhibiting enhanced corrosion resistance.

4. The metallic tubular structure of claim 3 wherein each of said first inner metallic tubular member, said second metallic tubular member, said third metallic tubular member, and said fourth metallic tubular member is formed from a metal selected from the group consisting of steel and aluminum.

5. The metallic tubular structure of claim 4 wherein said metal is steel.

6. The metallic tubular structure of claim 1 wherein said multi-layer, metallic tubular structure is a fuel filler tube configured to reside between an automotive fuel inlet port and an automotive fuel tank.

7. The metallic tubular structure of claim 1 wherein said flexible segment is configured as one or more corrugated sections.

8. The metallic tubular member of claim 6 wherein said first multi-layer, strength-enhanced end is configured to sealably join with said automotive fuel inlet port and said multi-layer, strength-enhanced second end is configured to sealably join with said automotive fuel tank.

9. The metallic tubular structure of claim 1 further comprising a corrosion-inhibiting protective cover layer surrounding the outer surface of said metallic tubular structure.

10. The metallic tubular structure of claim 9 wherein said corrosion-inhibiting protective cover is a polymeric material selected from the group consisting of styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers (EPDM), ultra high molecular weight polyethylene, high density polyethylene, ethylene-acrylic, polyacrylic, polyamide, and blends thereof.

11. A steel fuel filler tube, said steel fuel filler tube having an inner surface providing a passage for conveying fluid, an outer surface, a multi-layer, strength-enhanced first end segment, a multi-layer, strength-enhanced second end segment, and a flexible segment intermediate said multi-layer, strength-enhanced first end segment and said multi-layer, strength-enhanced second end segment, said fuel filler tube comprising:

a first steel inner tubular member comprising one or more steel layers, said first steel inner tubular member having a continuous length longitudinally extending the entire length of said fuel filler tube;

a second steel tubular member circumferentially disposed on said first steel inner tubular member, wherein said second steel tubular member has a length less than said continuous length of said first inner steel tubular member, said second steel tubular member longitudinally extending a predetermined distance on said first tubular member forming a first multi-layer, strength-enhancing segment thereat;

a third steel tubular member circumferentially disposed on said second steel tubular member, wherein said third steel tubular member has a length less than said continuous length of said first inner steel tubular member, said third steel tubular member longitudinally extending a predetermined distance on said first steel tubular member forming a second multi-layer, strength-enhancing segment thereat; and a fourth steel tubular member circumferentially disposed on said third steel tubular member, wherein said fourth steel tubular member has a length less than said length of said third steel tubular member, said fourth steel tubular member longitudinally extending a predetermined distance on said third steel tubular member forming a third multi-layer segment thereat, wherein said second steel tubular member and said third steel tubular member are spaced apart on said outer surface of said first inner steel tubular member such that said second steel tubular member and said third steel tubular member are not contiguous with one another.

12. The steel fuel filler tube of claim 11 further comprising a corrosion-inhibiting protective cover layer circumferentially surrounding the outer surface of said steel tubular structure.

13. The steel fuel filler tube of claim 12 wherein said corrosion-inhibiting protective cover is a polymeric material selected from the group consisting of styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers (EPDM), ultra high molecular weight polyethylene, high density polyethylene, ethylene-acrylic, polyacrylic, polyamide, and blends thereof.

14. The steel fuel filler tube of claim 13 wherein said flexible segment is configured as one or more corrugated sections.

15. A method of manufacturing a metallic tubular structure for conveying fluid or vapor, said method comprising the steps of:

providing a first inner metallic tubular member having a predetermined continuous length extending from a first end thereof to a second end thereof, wherein said first metallic tubular member is formed from one or more metallic layers, wherein each of said metallic layers is a corrosion-resistant metal selected from the group consisting of steel and aluminum;

providing a second metallic tubular member having a predetermined continuous length less than said predetermined continuous length of said first inner metallic tubular member;

providing a third metallic tubular member having a predetermined continuous length less than said predetermined continuous length of said first inner metallic tubular member;

providing a fourth metallic tubular member having a predetermined continuous length less than said predetermined continuous length of said third metallic tubular structure;

circumferentially mounting said second metallic tubular member on a first end of said first inner metallic tubular member such that said second metallic tubular member circumferentially extends from said first end forming a first multi-layer, strength-enhanced segment thereat;

circumferentially mounting said third metallic tubular member on a second end of said first inner metallic tubular member such that said third metallic tubular member circumferentially extends from said second end forming a second multi-layer, strength-enhanced segment thereat;

circumferentially mounting said fourth metallic tubular member on said third metallic tubular member such that said fourth metallic tubular member circumferentially extends from said second end forming a third multi-layer, strength-enhanced segment thereat; and forming a flexible segment in said first inner metallic tubular member intermediate said second metallic tubular member and said third metallic tubular member.

16. The method of claim 15 wherein said step of forming said flexible segment comprises forming one or more corrugated section in said first metallic tubular member at a predetermined location intermediate said first end and said second end after forming said metallic tubular structure.

17. The method of claim 16 further comprising the step of providing a protective cover layer on the entire outer surface of said multi-layer metallic tube, wherein said protective cover is a polymeric material selected from the group consisting of styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers, ultra high molecular weight polyethylene, high density polyethylene, ethylene-acrylic, polyacrylic, polyamide, and blends thereof.

18. The method of claim 15 wherein said first inner metallic tubular member is a metallic fuel filler tube configured to reside between an automotive fuel inlet port and an automotive fuel tank.

19. The method of claim 15 wherein each of said first inner metallic tubular member, said second metallic tubular member, said third metallic tubular member, and said fourth metallic tubular member is formed from a metal selected from the group consisting of steel and aluminum.

20. The method of claim 19 wherein said metal is steel.

* * * * *